United States Patent

Nogiwa

[19]

[11] Patent Number: 6,091,526
[45] Date of Patent: Jul. 18, 2000

[54] LIGHT SOURCE DEVICE FOR FREQUENCY DIVISION MULTIPLEXED OPTICAL COMMUNICATIONS

[75] Inventor: Seiji Nogiwa, Tokyo, Japan

[73] Assignee: Ando Electric Co., Ltd., Tokyo, Japan

[21] Appl. No.: 08/918,848

[22] Filed: Aug. 26, 1997

[30] Foreign Application Priority Data

Aug. 30, 1996 [JP] Japan .................................. 8-231203

[51] Int. Cl.⁷ .................................................. H04J 14/02
[52] U.S. Cl. .......................................... 359/133; 359/187
[58] Field of Search .................................... 359/124, 133, 359/187

[56] References Cited

U.S. PATENT DOCUMENTS

| | | | |
|---|---|---|---|
| 4,839,614 | 6/1989 | Hill et al. ................................. | 332/7.51 |
| 4,989,201 | 1/1991 | Clance ..................................... | 359/133 |
| 5,387,992 | 2/1995 | Miyazaki et al. ......................... | 359/124 |
| 5,589,970 | 12/1996 | Lyu et al. ................................. | 359/133 |
| 5,861,975 | 1/1999 | Sakuyama et al. ...................... | 359/187 |
| 5,920,414 | 7/1999 | Miyachi et al. .......................... | 359/133 |

Primary Examiner—Leslie Pascal
Attorney, Agent, or Firm—Darby & Darby

[57] ABSTRACT

The object of the invention is to offer a light source device for frequency division multiplexed optical communications having a compact size and reduced cost. Light source units 100–300 output light having optical frequencies which oscillate at mutually different modulation frequencies centered about mutually different optical frequencies. Optical splitters 1–3 split the output light from each light source unit into two parts. An optical multiplexer-splitter 4 multiplexes and splits the output light from the optical splitters. The Fabry-Perot etalon resonator 5 transmits each component of the output light from the optical multiplexer-splitter 4 at a specific transmission rate corresponding to each optical frequency. A light receiving element 6 converts the output light from the Fabry-Perot etalon resonator 5 into an electrical signal, and a light receiving element 7 converts the output light from the optical multiplexer-splitter 4 into an electrical signal. A transmission change sensing unit 400–600 is provided for each light source unit, and senses the change in transmission of the Fabry-Perot etalon resonator at the optical frequency of the corresponding light source unit. A CPU 8 controls each light source unit by feedback such as to maximize the output of each transmission change sensing unit.

12 Claims, 4 Drawing Sheets

LIGHT SOURCE DEVICE FOR FREQUENCY DIVISION MULTIPLEXED OPTICAL COMMUNICATIONS

BACKGROUND OF THE INVENTION

1. Field of the Invention

The present invention relates to a light source for frequency division multiplexed communications for use in optical communications.

2. Background Art

Among conventional light source devices having a plurality of semiconductor lasers which output light of different frequencies, one known method for stabilizing the optical frequencies of the semiconductors is to provide a plurality of semiconductor lasers having different output frequencies and a plurality of Fabry-Perot etalon resonators corresponding to these semiconductor lasers, then using the optical frequency discrimination capabilities of Fabry-Perot etalon resonators to control the drive currents of the semiconductor lasers by feedback of the outputs of the corresponding Fabry-Perot etalon resonators.

However, such conventional light source devices for frequency division multiplexed optical communications as described above use a separate Fabry-Perot etalon resonator for each optical frequency to be stabilized, as a result of which the devices can become massive and the production costs can rise.

SUMMARY OF THE INVENTION

The present invention has been made in view of this background art, and has the object of offering a light source device for frequency multiplexed optical communications which can be made more compact and at a reduced cost.

The present invention comprises a plurality of light sources for outputting light having optical frequencies which oscillate at mutually different modulation frequencies centered about mutually different optical frequencies; a plurality of splitting means corresponding to the respective light sources, each splitting means being provided for splitting output light from a corresponding light source into two parts, and outputting one part to an output end; multiplexing-splitting means for multiplexing the other parts of the light outputted by the plurality of splitting means, and splitting the multiplexed light into two outputs; transmitting means for transmitting the respective components of light in the first output of the multiplexing-splitting means at specified transmission rates corresponding to the optical frequencies of the components of light; first light receiving means for detecting the output light transmitted by the transmitting means; second light receiving means for detecting the second output of the multiplexing-splitting means; a plurality of transmission rate change detecting means corresponding to the respective light sources, each transmission rate change detecting means being provided for detecting an amount of change in transmission rate of the transmitting means at the optical frequency of a corresponding light source, from the frequency component at the modulation frequency of the corresponding light source in the output signal of the first light receiving means and the frequency component at the modulation frequency of the corresponding light source in the output signal of the second light receiving means; and control means for controlling the plurality of light sources by feedback such as to maximize the outputs of the plurality of transmission rate change detecting means.

Additionally, the present invention comprises a plurality of light sources for outputting light having optical frequencies which oscillate at mutually different modulation frequencies centered about mutually different optical frequencies; a plurality of splitting means corresponding to the respective light sources, each splitting means being provided for splitting output light from a corresponding light source into two parts, and outputting one part to an output end; multiplexing means for multiplexing the other parts of the light outputted by the plurality of splitting means; transmitting means for transmitting the respective components of light in the output of the multiplexing means at specified transmission rates corresponding to the optical frequencies of the components of light; light receiving means for detecting the output light transmitted by the transmitting means; and a plurality of control means corresponding to the respective light sources, each control means being provided for phase-detecting the frequency component at the modulation frequency of a corresponding light source in the output signal from the light receiving means with a signal of the modulation frequency as a reference signal, and controlling the corresponding light source by feedback such that the output of the phase detection is held at zero.

The present invention enables the size and cost of devices to be reduced by enabling the central frequencies of light outputted by a plurality of light sources to be fixed at respectively different or identical optical frequencies, using the frequency discriminating properties of a single Fabry-Perot etalon resonator, by modulating the optical frequencies of light outputted from a plurality of light sources by respectively different modulation frequencies.

DESCRIPTION OF PREFERRED EMBODIMENTS OF THE INVENTION

Hereinbelow, embodiments of the present invention shall be explained with reference to the drawings.

A. First Embodiment (1) Structure

Figure 1:
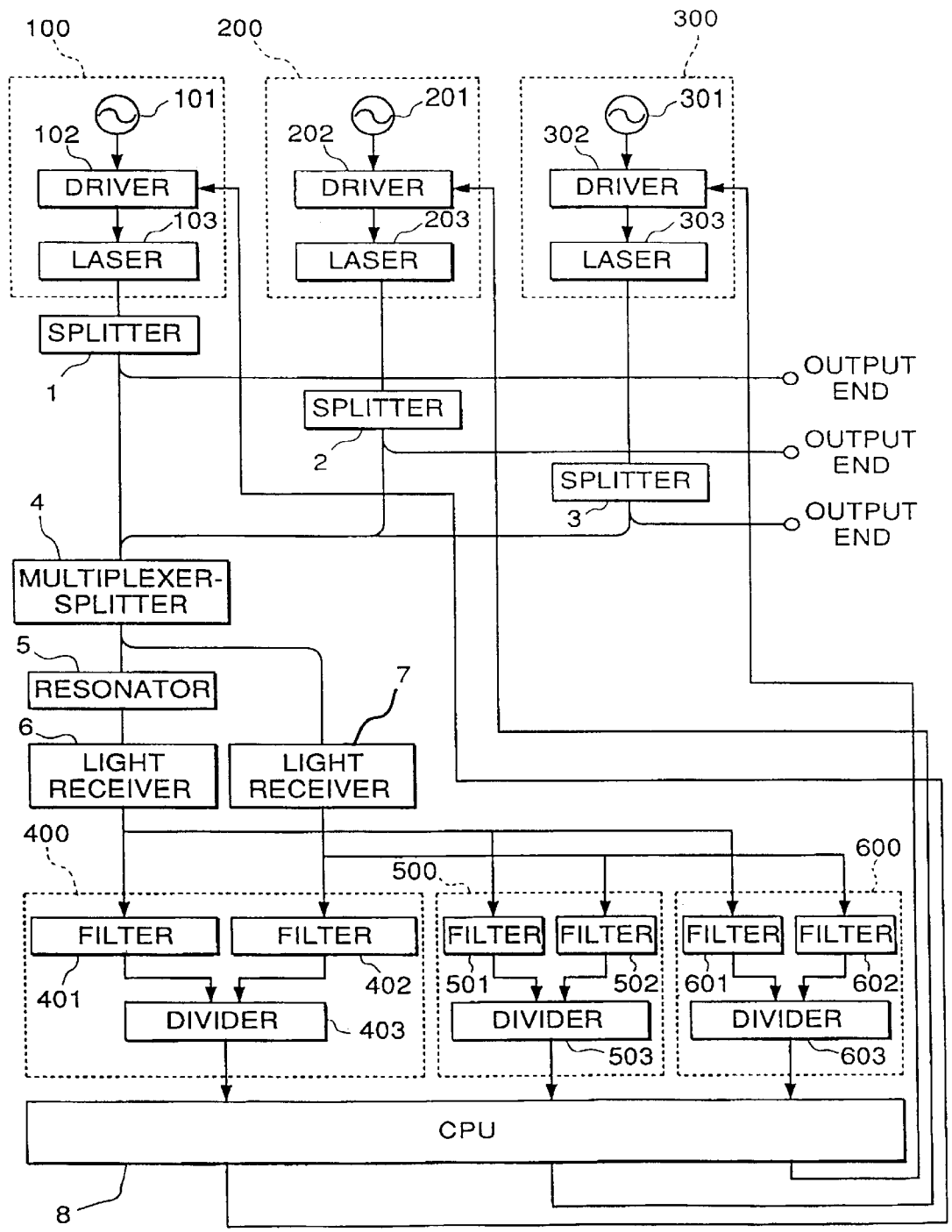
FIG. 1 is a block diagram showing an example of the structure of a light source device for frequency division multiplexed optical communications according to a first embodiment of the present invention.

FIG. 1 is a block diagram showing an example of the structure of a light source device for frequency division multiplexed optical communications according to a first embodiment of the present invention. In FIG. 1, the arrows indicate the direction of flow of the electrical signals, and the solid lines indicate optical signal connections. This light source device for frequency division multiplexed optical communications comprises a plurality of light source units 100–300, a plurality of optical splitters 1–3, a plurality of transmission change sensing units 400–600, an optical multiplexer-splitter 4, a Fabry-Perot etalon resonator 5, two light receiving elements 6, 7 and a CPU 8. While a plurality of light source units also exist between light source unit 200 and light source unit 300, these have been omitted from the drawings. Additionally, while a plurality of optical splitters also exist between optical splitter 2 and optical splitter 3, these have been omitted from the drawings. Additionally, while a plurality of transmission change sensing units exist between transmission change sensing unit 500 and transmission change sensing unit 600, these have also been omitted from the drawings.

The light source unit 100 comprises an oscillator 101, a drive circuit 102 and a semiconductor laser 103, and light source units 200 and 300 have the same structure.

The transmission change sensing unit 400 comprises two bandpass filters 401, 402, and a divider 403, and transmission change sensing units 500 and 600 have the same structure.

(2) Operation

The operation of light source unit 100 shall be explained. The oscillator 101 outputs a signal having a frequency ν1 to the drive circuit 102. The drive circuit 102 adjusts the drive current and temperature so that the output beam from the semiconductor laser 103 has a target optical frequency $f1$ instructed by the CPU 8, and superimposes the signal of frequency ν1 received from the oscillator 101 onto the drive current. As a result, the drive circuit 102 causes the frequency of the output beam from the semiconductor laser 103 to oscillate at a frequency ν1 centered about the target optical frequency $f1$.

The light source units 200 and 300 operate in the same manner as light source unit 100. However, the output frequencies of oscillators 201 and 301 are respectively ν2 and ν3, and the oscillator in each light source unit has a different frequency. Additionally, the optical frequencies outputted by the light source units 200 and 300 are $f2$ and $f3$, and the optical frequency outputted by each light source unit has a different optical frequency.

Figure 2:
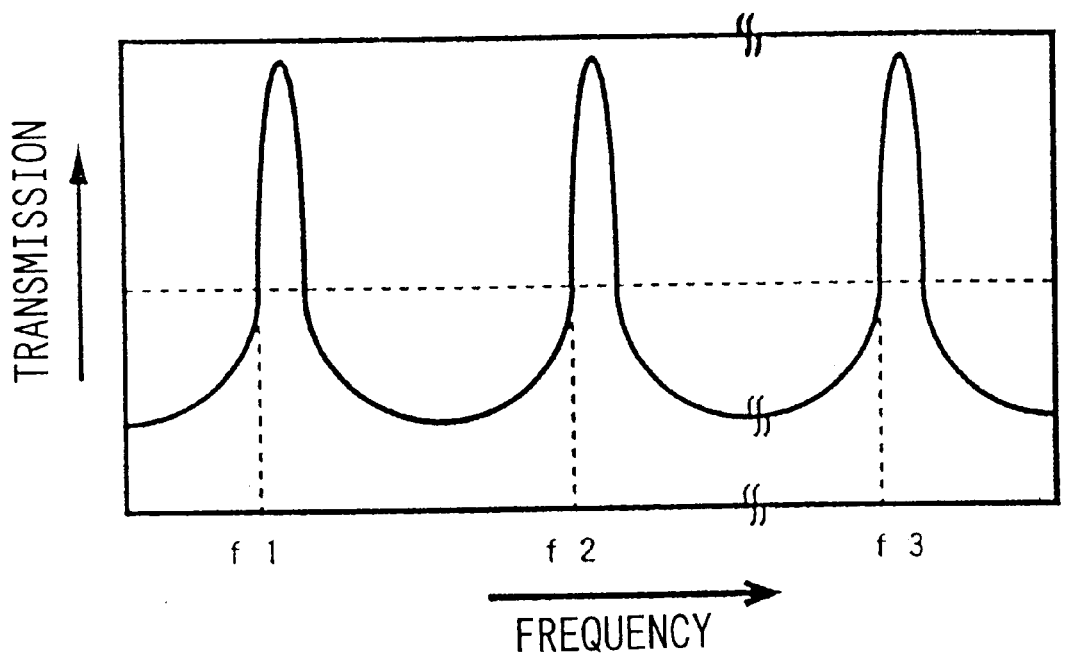
FIG. 2 is a diagram showing the relationship between the optical frequency and transmission of the Fabry-Perot etalon resonator 5 in the first embodiment of the present invention.

The beam outputted from each light source unit is inputted into a corresponding optical splitter 1–3, and one part is sent to an output terminal, while the other part is sent to the optical multiplexer-splitter 4. The optical multiplexer-splitter 4 first multiplexes the input light, then splits the multiplexed light into two parts which are respectively sent to the Fabry-Perot etalon resonator 5 and the light receiving element 7. The Fabry-Perot etalon resonator 5 has a relationship between transmission and optical frequency as shown in FIG. 2, due to the resonator structure. At this time, the optical frequencies $f1$–$f3$ outputted by each light source unit are preset at frequencies with high transmission changes. The multiplexed light inputted into the Fabry-Perot etalon resonator 5 is converted to an optical intensity which depends on the transmissions of the optical frequencies $f1$–$f3$, and the output is a combination of the respective optical intensities. The light receiving element 6 converts the multiplexed light outputted by the Fabry-Perot etalon resonator 5 into an electrical signal, which is then outputted to the transmission change sensing units 400–600. On the other hand, the light receiving element 7 converts the inputted multiplexed light into an electrical signal which is then outputted to the transmission change sensing units 400–600.

Next, the operations of the transmission change sensing unit 400 shall be explained. The transmission change sensing unit 400 inputs the output signal of the light receiving element 6 to a bandpass filter 401 in the unit, and inputs the output signal of the light receiving element 7 to a bandpass filter 402. The bandpass filters 401 and 402 output only the signals of frequency ν1 among the input signals to the divider 403. The divider 403 makes a calculation by taking the output signal from the bandpass filter 402 as the divisor and the output signal from the bandpass filter 401 as the dividend, then rectifies a value proportional to the result as the output. Consequently, the output signal of the divider 403 outputs a signal proportional to the transmission deviation of the output light from the light source unit 100 in the Fabry-Perot etalon resonator 5.

The transmission change sensing units 500 and 600 operate in the same manner as the transmission change sensing unit 400. However, each bandpass filter in the transmission change sensing units outputs only signals of the output frequencies ν2 and ν3 of the oscillator in each light source unit controlled by the CPU 8 to each divider. Consequently, each divider outputs a signal proportional to the transmission deviation change of the output light of each light source unit controlled by the CPU 8 in the Fabry-Perot etalon resonator 5.

The CPU 8 outputs a signal to the drive circuit in each light source unit such that the output signal of each transmission change sensing unit is always held at the maximum value.

According to the above operations, the optical frequencies outputted from the output end are fixed at the optical frequencies which maximize the change in the transmission with respect to changes in the optical frequencies in the Fabry-Perot etalon resonator 5.

B. Second Embodiment (1) Structure

Figure 3:
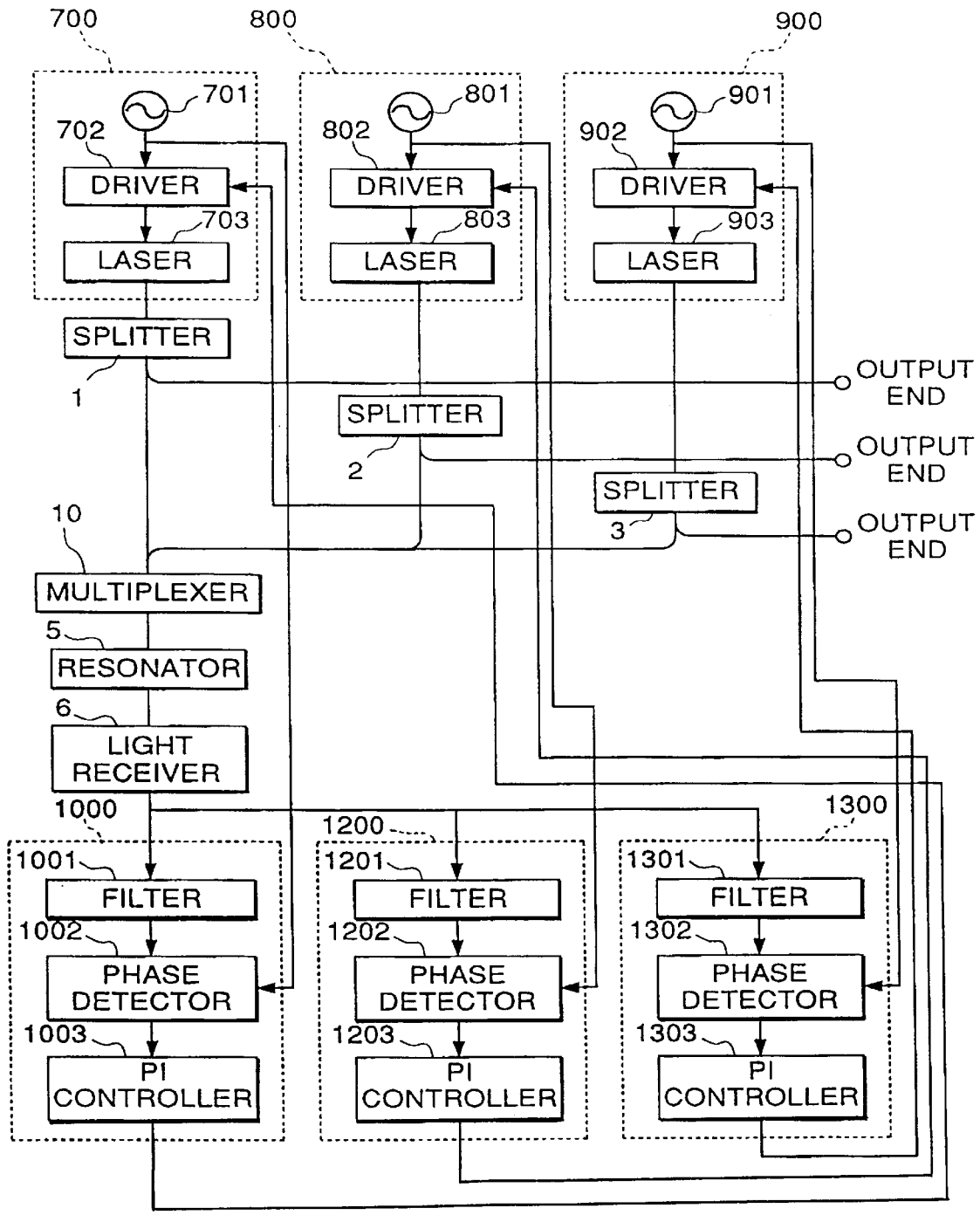
FIG. 3 is a block diagram showing an example of the structure of a light source device for frequency division multiplexed optical communications according to a second embodiment of the present invention.

FIG. 3 is a block diagram showing an example of the structure of a light source device for frequency division multiplexed optical communications according to a second embodiment of the present invention. In FIG. 3, the arrows indicate the direction of flow of electrical signals, and the solid lines indicate optical signal connections. This light source device for frequency division multiplexed optical communications comprises a plurality of light source units 700–900, a plurality of optical splitters 1–3, a plurality of control circuit units 1000–1200, an optical multiplexer 10, a Fabry-Perot etalon resonator 5 and a light receiving element 6. While a plurality of light source units also exist between light source unit 800 and light source unit 900, these have been omitted from the drawings. While a plurality of optical splitters exist between optical splitter 2 and optical splitter 3, these have also been omitted from the drawing. Additionally, while a plurality of control circuit units also exist between the control circuit unit 1100 and the control circuit unit 1200, these have also been omitted from the drawings.

The light source unit 700 comprises an oscillator 701, a drive circuit 702 and a semiconductor laser 703, and the light source units 800 and 900 have the same structure.

The control circuit unit 1000 comprises a bandpass filter 1001, a phase detector 1002 and a PI control circuit 1003, and the control circuit units 1100 and 1200 have the same structure.

(2) Operations

The operations of the light source unit 700 shall be explained. The oscillator 701 outputs a signal having a frequency ν4 to the drive circuit 702 and the control circuit unit 1000. The drive circuit 702 adjusts the drive current and temperature so that the output light from the semiconductor laser 703 is held at an optical frequency $f4$ instructed by the control circuit unit 1000, and superimposes the signal having a frequency ν4 received from the oscillator 701 onto the drive current. Consequently, the output optical frequency of the semiconductor laser 703 oscillates at a frequency ν4 centered about the target optical frequency $f4$ due to the drive circuit 702.

The light source units 800 and 900 operate in the same manner as the light source unit 700. However, the output frequencies of the oscillators 801 and 901 are ν5 and ν6, and the frequencies of the oscillators of the respective light source units are different. Additionally, the outputs of the light source units 800 and 900 have optical frequencies $f5$ and $f6$, and the optical frequencies outputted by the respective light source units are different.

The light outputted by each light source unit is inputted respectively to the optical splitters 1–3, and one part is sent to the output terminal while the other part is sent to the optical multiplexer 10. The optical multiplexer 10 multiplexes the input light and outputs the result to the Fabry-Perot etalon resonator 5. The multiplexed light inputted to the Fabry-Perot etalon resonator 5 is converted to optical intensities depending on the transmission of the optical frequencies $f4$–$f6$, and the output is a combination of the respective optical intensities. The light receiving element 6 converts the multiplexed light outputted by the Fabry-Perot etalon resonator 5 into an electrical signal, which is then outputted to the control circuit units 1000–1200.

Next, the operations of the control circuit unit 1000 shall be explained. The control circuit unit 1000 inputs the output signal from the light receiving element 6 to the bandpass filter 1001 in the unit. The bandpass filter 1001 outputs only the signal of frequency ν4 among the input signal to the phase detector 1002. The phase detector 1002 detects the signal inputted from the bandpass filter 1001 with the signal inputted from the light source unit 700 for synchronization, and outputs a smoothed signal to the PI control circuit 1003.

Figure 4A:
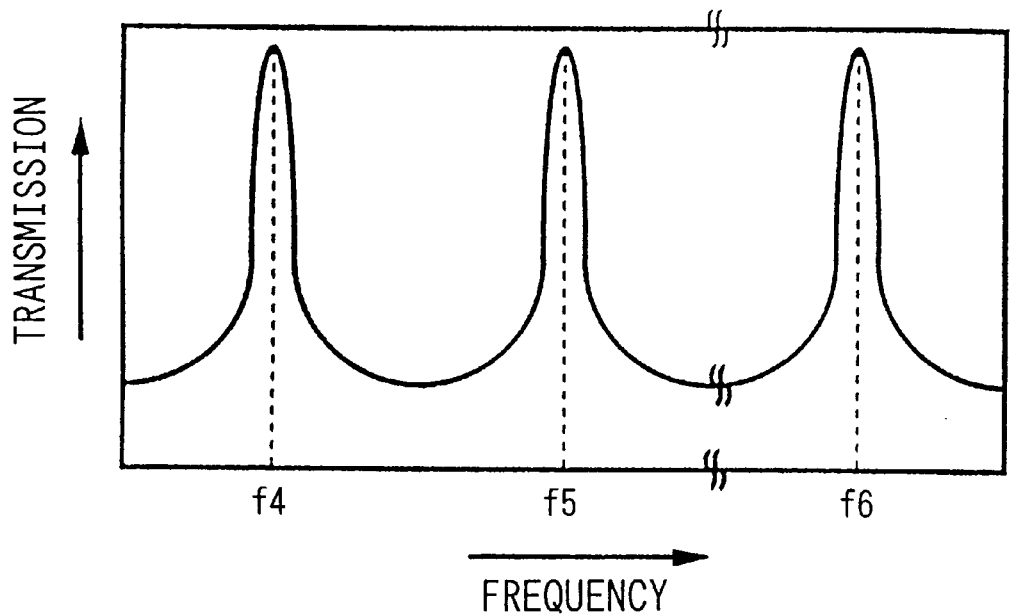
FIG. 4A is a diagram showing the relationship between the optical frequency and transmission of the Fabry-Perot etalon resonator 5 in the second embodiment of the present invention.
Figure 4B:
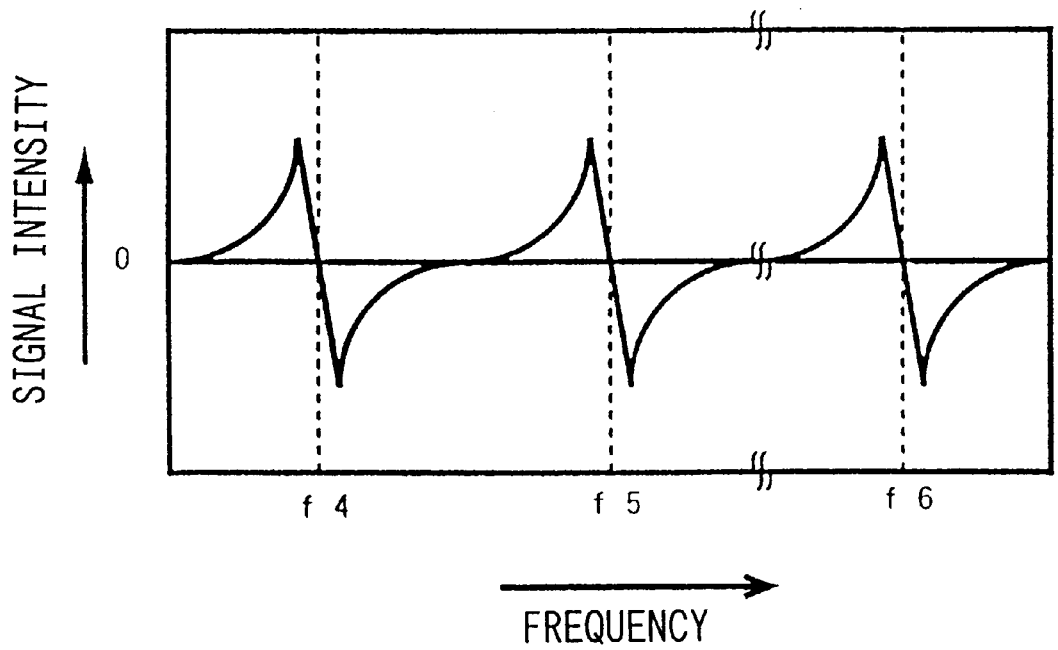
FIG. 4B is a diagram showing the relationship between the signal intensity and the central frequency immediately after the phase detector has detected synchronization in the second embodiment of the present invention.

FIG. 4A shows an example of the relationship between the optical frequency and the transmission in the Fabry-Perot etalon resonator 5. FIG. 4B shows an example of the relationship between the central optical frequency of the output from the light source unit and the signal intensity immediately after synchronization detection by the phase detector. The maximum values of the transmission with respect to the optical frequency of the Fabry-Perot etalon resonator as shown in FIG. 4A corresponds to the zeros of the signal intensities immediately after the synchronization detection in the phase detector as shown in FIG. 4B.

The PI control circuit 1003 performs proportional integral control of the drive circuit 702 in the light source unit 700 such that the output signal of the phase detector 1002 is held at zero.

The control circuit units 1100 and 1200 operate in the same manner as the control circuit unit 1000. However, among the input signals, the bandpass filters in the control circuit units 1100 and 1200 output only the signals of frequencies ν5 and ν6 superimposed on the drive currents of the semiconductor lasers in the light source units being controlled to the phase detectors of subsequent stages. The phase detectors in the control circuit units 1100 and 1200 perform synchronization detection of the output signals of the oscillators in the light source units being controlled. Additionally, the outputs of the control circuit units 1100 and 1200 are fed back to the light source units being controlled.

Due to the above operations, the central frequencies outputted at the output end are respectively fixed at optical frequencies corresponding to different maximums of the transmission with respect to the optical frequencies of the Fabry-Perot etalon resonator 5.

While embodiments of the present invention have been explained in detail above with reference to the drawings, the specific structure is not restricted to these embodiments, and all design modifications within a range such as not to contradict the gist of the present invention are included within the scope of the present invention.

What is claimed is:

1. A light source device for frequency division multiplexed optical communications, comprising:

a first light source for outputting light having a frequency which oscillates at a first modulation frequency centered about a first optical frequency;

first splitting means for splitting output light from said first light source into two parts, and outputting one part to an output end;

a second light source for outputting light having a frequency which oscillates at a second modulation frequency different from said first modulation frequency centered about a second optical frequency different from said first optical frequency;

second splitting means for splitting output light from said second light source into two parts, and outputting one part to the output end;

multiplexing-splitting means for multiplexing the other parts of the light outputted by said first splitting means and said second splitting means, and splitting the multiplexed light into two outputs;

transmitting means for transmitting the respective components of light in the first output of said multiplexing-splitting means at specified transmission rates corresponding to the optical frequencies of said components of light;

first light receiving means for detecting the output light transmitted by said transmitting means;

second light receiving means for detecting the second output of said multiplexing-splitting means;

first transmission rate change detecting means for detecting an amount of change in transmission rate of said transmitting means at said first optical frequency from the frequency component at said first modulation frequency in the output signal of said first light receiving means and the frequency component at said first modulation frequency in the output signal of said second light receiving means;

second transmission rate change detecting means for detecting an amount of change in transmission rate of said transmitting means at said second optical frequency from the frequency component at said second modulation frequency in the output signal of said first light receiving means and the frequency component at said second modulation frequency in the output signal of said second light receiving means; and control means for controlling said first light source and said second light source by feedback such as to maximize the outputs of said first transmission rate change detecting means and said second transmission rate change detecting means.

2. A light source device in accordance with claim 1, wherein each light source comprises a semiconductor laser, an oscillator for outputting a signal which oscillates at one of said modulation frequencies, and a drive circuit for controlling the drive current and temperature of said semiconductor laser in order to adjust the central frequency of said semiconductor laser to one of said optical frequencies which modulating the optical frequency by the modulation frequency received from said oscillator; and said control means controls the drive current of each light source such as to maximize the respective outputs of said transmission rate change detecting means.

3. A light source device for frequency division multiplexed optical communications in accordance with claim 2, wherein said transmitting means is a Fabry-Perot etalon resonator.

4. A light source devices in accordance with claim 1, wherein each transmission rate change detecting means comprises a first bandpass filter for receiving an output signal from said first light receiving means and outputting only a signal having the modulation frequency of a corresponding light source, a second bandpass filter for receiving an output signal from said second light receiving means and outputting only a signal having the modulation frequency of a corresponding light source, and a divider for dividing an output value of said first bandpass filter with an output value of said second bandpass filter.

5. A light source device for frequency division multiplexed optical communications in accordance with claim 4, wherein said transmitting means is a Fabry-Perot etalon resonator.

6. A light source device for frequency division multiplexed optical communications in accordance with claim 1, wherein said transmitting means is a Fabry-Perot etalon resonator.

7. A light source device for frequency division multiplexed optical communications, comprising:

a plurality of light sources for outputting light having optical frequencies which oscillate at mutually different modulation frequencies centered about mutually different optical frequencies;

a plurality of splitting means corresponding to the respective light sources, each splitting means being provided for splitting output light from a corresponding light source into two parts, and outputting one part to an output end;

multiplexing-splitting means for multiplexing the other parts of the light outputted by said plurality of splitting means, and splitting the multiplexed light into two outputs;

transmitting means for transmitting the respective components of light in the first output of said multiplexing-splitting means at specified transmission rates corresponding to the optical frequencies of said components of light;

first light receiving means for detecting the output light transmitted by said transmitting means;

second light receiving means for detecting the second output of said multiplexing-splitting means;

a plurality of transmission rate change detecting means corresponding to the respective light sources, each transmission rate change detecting means being provided for detecting an amount of change in transmission rate of said transmitting means at the optical frequency of a corresponding light source, from the frequency component at the modulation frequency of the corresponding light source in the output signal of said first light receiving means and the frequency component at the modulation frequency of the corresponding light source in the output signal of said second light receiving means; and control means for controlling said plurality of light sources by feedback such as to maximize the outputs of said plurality of transmission rate change detecting means.

8. A light source device in accordance with claim 7, wherein each light source comprises a semiconductor laser, an oscillator for outputting a signal which oscillates at one of said modulation frequencies, and a drive circuit for controlling the drive current and temperature of said semiconductor laser in order to adjust the central frequency of said semiconductor laser to one of said optical frequencies while modulating the optical frequency by the modulation frequency received from said oscillator; and said control means controls the drive current of each light source such as to maximize the respective outputs of said transmission rate change detecting means.

9. A light source device for frequency division multiplexed optical communications in accordance with claim 8, wherein said transmitting means is a Fabry-Perot etalon resonator.

10. A light source device in accordance with claim 7, wherein each transmission rate change detecting means comprises a first bandpass filter for receiving an output signal from said first light receiving means and outputting only a signal having the modulation frequency of a corresponding light source, a second bandpass filter for receiving an output signal from said second light receiving means and outputting only a signal having the modulation frequency of a corresponding light source, and a divider for dividing an output value of said first bandpass filter with an output value of said second bandpass filter.

11. A light source device for frequency division multiplexed optical communications in accordance with claim 10, wherein said transmitting means is a Fabry-Perot etalon resonator.

12. A light source device for frequency division multiplexed optical communications in accordance with claim 7, wherein said transmitting means is a Fabry-Perot etalon resonator.

* * * * *